MULTIPLE SYMBOL GRAPHICAL RECORDER

Filed Jan. 8, 1963 3 Sheets-Sheet 1

INVENTORS.
MONROE A. MILLER
JERRY A. STEGENGA
BY
Browne, Schuyler, & Beveridge
ATTORNEYS.

INVENTORS.
MONROE A. MILLER
JERRY A. STEGENGA
BY
Brown, Schuyler, & Beveridge
ATTORNEYS.

INVENTORS.
MONROE A. MILLER
JERRY A. STEGENGA

BY Browne, Schuyler, & Beveridge
ATTORNEYS.

United States Patent Office 3,145,070
Patented Aug. 18, 1964

3,145,070
MULTIPLE SYMBOL GRAPHICAL RECORDER

Monroe A. Miller and Jerry A. Stegenga, Coral Gables, Fla., assignors to Milgo Electronic Corporation, a corporation of Florida Filed Jan. 8, 1963, Ser. No. 250,182
12 Claims. (Cl. 346—29)

This invention relates to graphical plotting recorders, and more particularly to a plotting assembly adopted for multiple symbol printing.

In the past decades, graphical plotting recorders have found a wide number of uses, particularly in relation to visual representation of computer outputs. As the efficiency and capacity of these computers have increased, it has become necessary to provide plotting and printing apparatus which is capable not only of high speed operation, but also which is capable of simultaneously recording multiple sets of data. While some plotting apparatus has been developed which is capable of high speed operation, and some multiple symbol printers have been utilized, such apparatus has generally been unable to satisfactorily combine these two features.

It is therefore an object of this invention to provide a high speed multiple symbol graphical plotting recorder.

It is another object of this invention to provide a multiple symbol graphical plotting recorder having low inertia and capable of operation in a vertical plane.

It is another object of this invention to provide a multiple symbol graphical plotting recorder wherein the symbol selection is accomplished independently of the printer's location on the board.

It is another object of this invention to provide an improved symbol printer.

It is another object of this invention to provide a multiple symbol graphical plotting recorder which is capable of simultaneously controlling plot location and symbol selection.

It is another object of this invention to provide a multiple symbol graphical plotting recorder which provides for simultaneous adjustment of the symbol printer in relation to the plotting board and of the symbol selector in relation to both the plotting board and to the symbol printer.

The invention of this application is accomplished by means of a unique combination of a plotting arm movable in a first coordinate, a multiple symbol printer mounted on the plotting arm and movable in a second coordinate, and control mechanisms mounted on the plotting arm for locating the printer at a point in its second coordinate and for selecting the symbol to be printed.

The printer includes a rotatable wheel having a number of printing symbols mounted upon it. The control mechanism on the arm operates through a first cable drive to move the printer along the arm, and through a second cable drive to rotate the wheel to move a selected symbol into a printing position. A differential gearing assembly in the control mechanism compensates for rotation of the wheel caused by movement of the printer along the plotting arm, so that the position of the wheel will be determined independently of the position of the printer. Because the control mechanism is mounted remotely from the printer, the mass of the latter is minimized, and the subsequent reduction in inertia facilitates high speed operation. Similarly the advantageous location of parts as disclosed herein permits vertical mounting of the plotting board.

Other objects, features and advantages of the present invention will become more apparent from the following detailed description taken in conjunction with the attached drawings in which.

Figure 1:
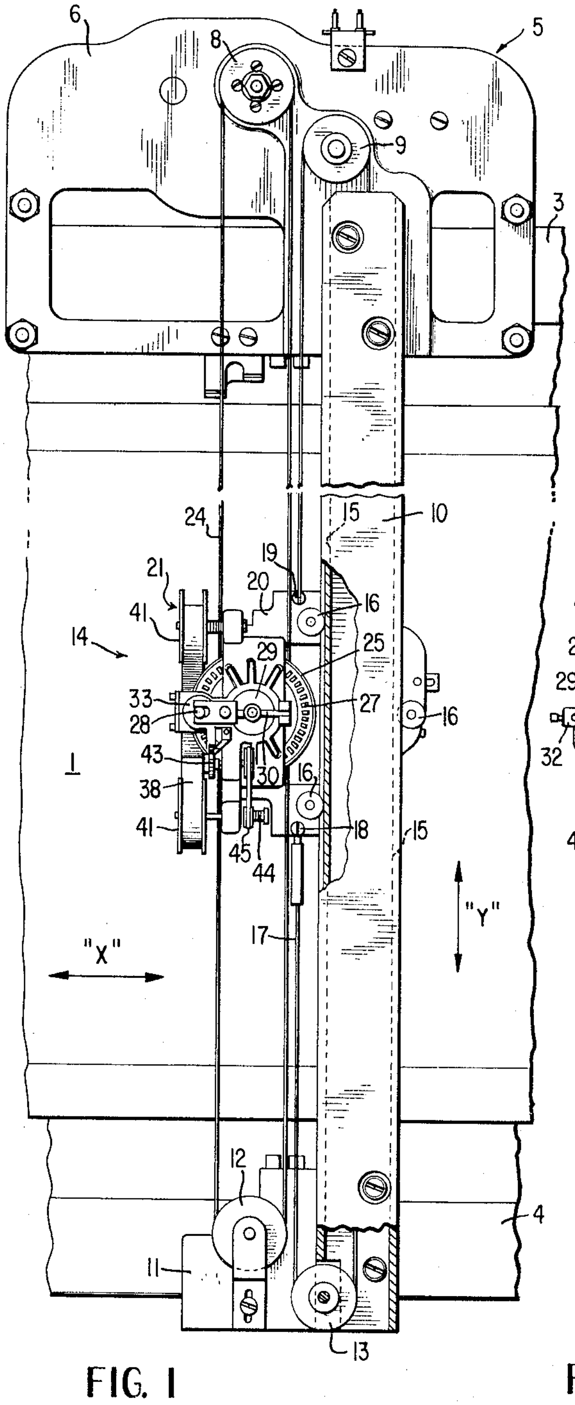
FIG. 1 is a fragmentary front elevational (or plan) view of the present invention showing the plotting arm as mounted over the plotting surface.
Figure 2:
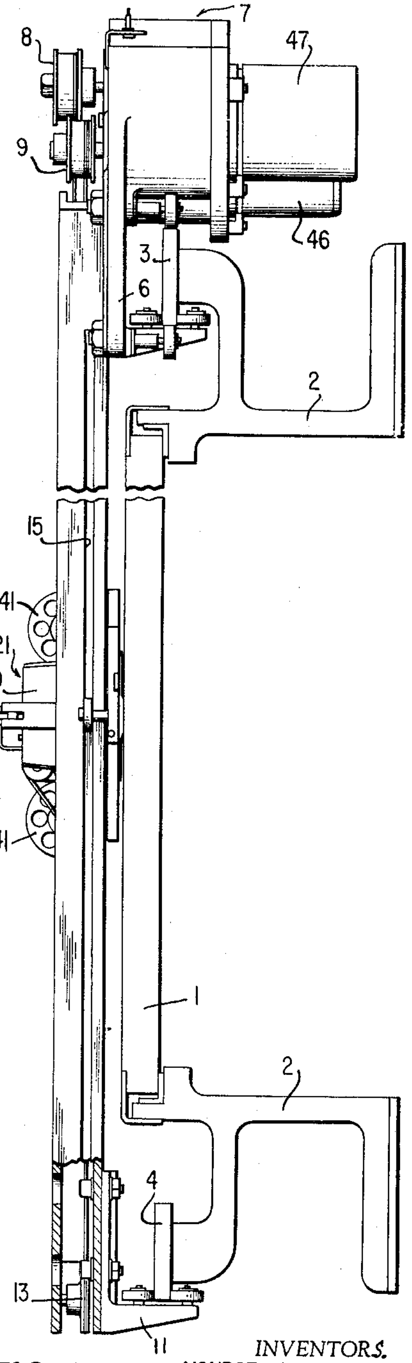
FIG. 2 is a fragmentary side view of the present invention.

Referring now to FIGS. 1 and 2, the graphical plotting recorder comprises a horizontal or vertical plotting surface 1, supports 2 attached to surface 1 and having tracks 3 and 4, and a plotting arm assembly 5 mounted on the tracks.

Plotting arm assembly 5 consists of four major parts: (1) An upper support 6 mounted on track 3; (2) a control mechanism 7 including a selector pulley 8 and a drive pulley 9 housed in upper support 6; (3) a hollow rectangular plotting arm 10, attached to upper support 6 and extending across plotting surface 1; and (4) a lower support 11. Lower support 11 rides on tracks 4 and has pulleys 12 and 13 mounted thereon. A printer 14 is supported on tracks 15 on arm 10 by wheels 16 and is moved along arm 10 by a cable 17 which is attached to recorder 14 at 18, strung around pulley 13 on lower support 11, through arm 10, around drive pulley 9 and attached again to recorder 14 at 19.

Printer 14 comprises a carriage 20, upon which are mounted wheels 16 to provide rolling support along arm 10, and a printing assembly 21, which is used in printing a selected symbol at a selected position on plotting surface 1.

Figure 3:
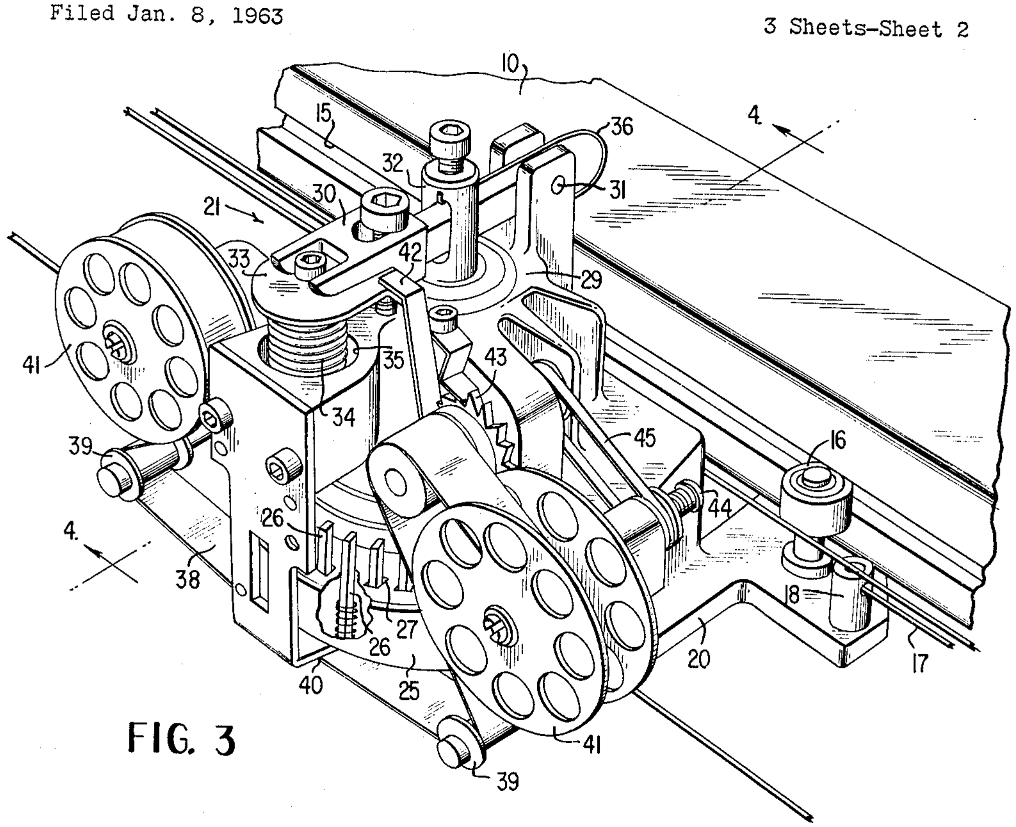
FIG. 3 is a perspective view of the multiple symbol printer.
Figure 4:
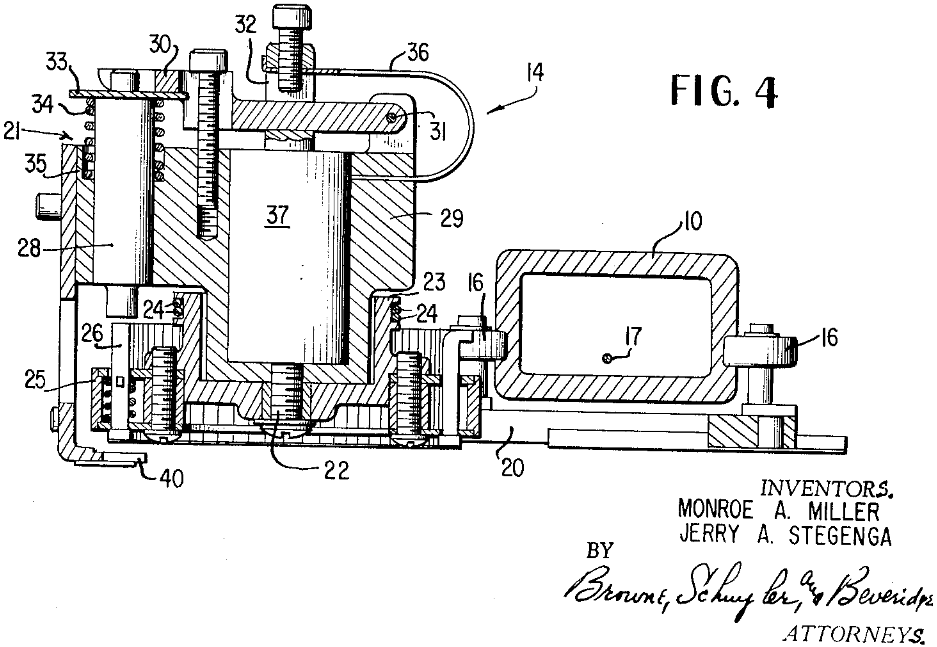
FIG. 4 is a sectional view of the printer taken along lines 4—4 of FIG. 3.

Referring now to FIGS. 3 and 4, a symbol wheel assembly is included in printing assembly 21 and is rotatably mounted on carriage 20 at 22. The symbol wheel assembly comprises a drive drum 23, which is loopedly engaged by a continuous cable 24 strung around selector pulley 8 and pulley 12 on lower support 11 (FIG. 1), a symbol wheel 25 attached to drive drum 23, and a plurality of printing members 26 springedly retained in slots 27 disposed near the outer periphery of wheel 25. The lower portion of each printing member 26 is a printing die representing a particular symbol. In this embodiment provision is made for forty such symbols, thereby permitting utilization of each letter of the alphabet as well as each of the digits and several arbitrary characters. The actual symbols employed are, of course, not critical to this invention.

In operation, symbol wheel 25 is rotated by means of fixed selector pulley 8 which displaces all points on continuous cable 24 to rotate drive drum 23 until a desired symbol is located under a striker 28 which is supported in a printer housing 29. An actuating arm 30 pivotally connected to housing 29 at 31 and extending through a solenoid plunger 32 rests on a plate 33 mounted on top of striker 28. A spring 34 seated in a recess 35 in housing 29 surrounds striker 28 and together with a spring 36 engaging solenoid plunger 32 urges striker 28 and solenoid plunger 32 into an upper position. When a printing signal is received, solenoid 37 will be energized to draw plunger 32 down, thereby causing striker 28 to descend and force printing member 26 against plotting surface 1 through an inked ribbon 38.

Ribbon 38 passes under pulleys 39 and a foot 40 and is mounted on spools 41 on each side of housing 29. Ribbon 38 is advanced by means of a pawl 42 mounted on plate 33 which engages a ratchet wheel 43 when solenoid plunger 32 is in its lower position. Ratchet wheel 43 is rotated when plunger 32 returns, and drives a shaft 44 to rotate one of spools 41 by means of a belt 45.

Figure 5:
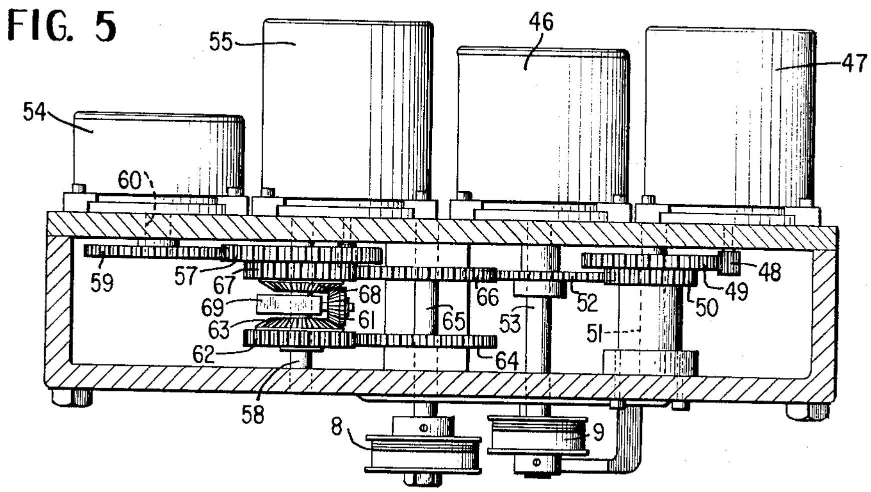
FIG. 5 is a top view of control mechanism of the present invention.
Figure 6:
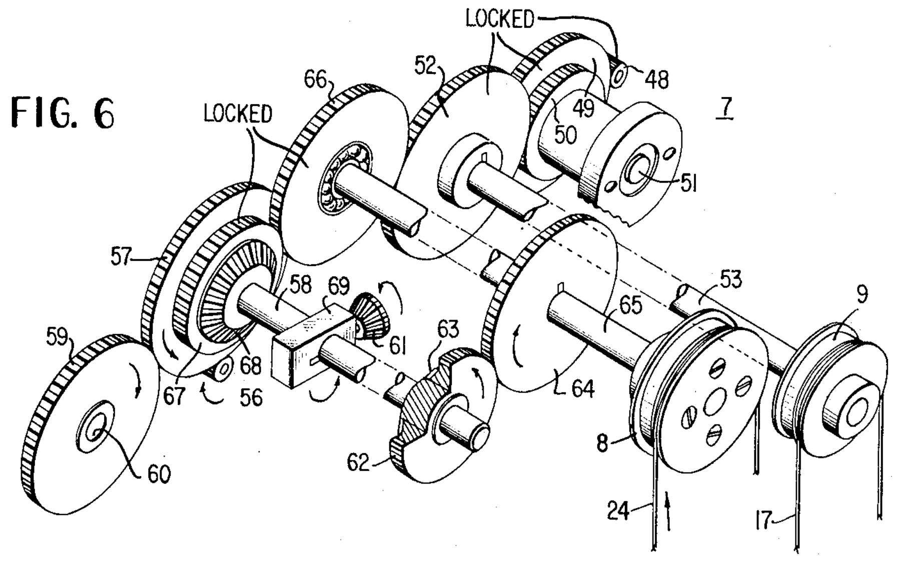
FIG. 6 is an exploded perspective view of the gearing arrangement of the control mechanism.
Figure 7:
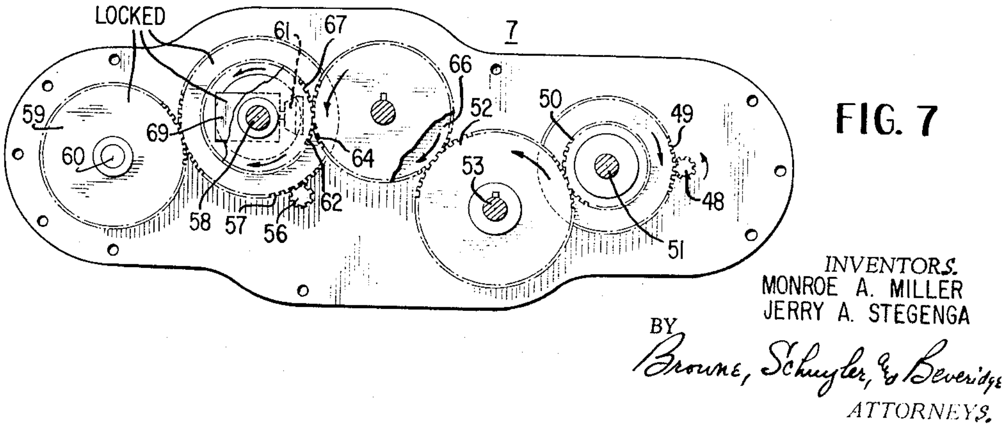
FIG. 7 is a front view of the gearing arrangement of the control mechanism.

The movement of recorder 14 along arm 10 and the rotation of symbol wheel 25 is controlled by means of control mechanism 7, shown in FIGS. 5–7, which drives selector pulley 8 and drive pulley 9. When it is desired to move recorder 14 to a selected position along arm 10, an unbalancing signal corresponding to the amount of movement desired is supplied by means not shown to a potentiometer 46. Drive motor 47 connected to potentiometer 46 acts as a servo follow up motor and responds in a well-known manner to the unbalance to rotate the armature of potentiometer 46 to re-establish a balanced condition. This is accomplished through a gear train comprising a driving gear 48 attached to the shaft of drive motor 47, gears 49 and 50 fixedly mounted on rotatable shaft 51, and gear 52 which is fixedly mounted on rotatable armature shaft 53. The rotation of armature shaft 53 also rotates drive pulley 9 which is secured to it, and recorder 14 is moved a corresponding distance along arm 10.

Similarly, when it is desired to rotate symbol wheel 25 to a selected position, an unbalancing signal is fed to a selector potentiometer 54. A selector motor 55 then operates through a driving gear 56, gear 57 which is fixedly mounted on rotatable shaft 58, and gear 59 to rotate selector potentiometer armature 60 to its neutral position. The rotation of shaft 58 also operates through a train comprising a spider gear 61 rotatably mounted on a spider shaft 69 which is attached to shaft 58, gear 62, including a face portion 63 rotatably mounted on shaft 58, and gear 64, fixedly mounted on rotatable shaft 65, to rotate selector pulley 8, which in turn causes cable 24 to rotate symbol wheel 25 the desired amount.

Besides permitting direct operation of selector and drive pulleys 8 and 9 by the selector and drive motors 55 and 47, control mechanism 7 includes a differential gearing arrangement which rotates selector pulley 8 to compensate for the tendency of symbol wheel 25 to be rotated out of position when printer 14 is moved relative to selector cable 24.

This gearing arrangement consists of a gear 67, which is indirectly driven by drive motor 47 as will be subsequently explained; an assembly consisting of shaft 58, spider shaft 69 and spider gear 61 driven by selector motor 55; and gear 62. The rotation of gear 62 is caused by the interaction of face portion 67 of gear 68 with spider gear 61 and represents the algebraic sum of the rotation caused by the drive motor and selector motor according to the formula $X=2Y-Z$ where X is the angular rotation of gear 62, Y is the angular rotation of shaft 58, and Z is the angular rotation of gear 67.

To best illustrate the function of the differential compensating means, the operation of control mechanism 7 under three possible conditions will be described:

A. *Recorder position fixed, symbol wheel to be rotated (FIG. 6)*.—Under this condition, gear 48 will be stationary and will maintain gears 49, 50 and 52, which were previously described, in a stationary or locked position. In addition, gear 52, which engages a gear 66 rotatably mounted on shaft 65, will maintain that gear in a locked position. Gear 66 in turn engages and locks a gear 67 rotatably mounted on shaft 58. Gear 67 has a face portion 68 which cooperates with spider gear 61.

Because gear 67 is locked, the rotation of shaft 58 and spider shaft 69, caused by the operation of selector motor 55, will move spider gear 61 around face 68 of gear 67. The consequent rotation of spider gear 61 will be imparted to gear 62 by face portion 63. This in turn rotates gear 64, shaft 65 and selector pulley 8.

Thus if a clockwise rotation of driving gear 56 is assumed (as shown in FIG. 6), gear 57, shaft 58 and spider shaft 69 will be rotated counterclockwise. Rotation of spider shaft 69 will roll spider gear 61 along the face portion 68 of locked gear 67, causing spider gear 61 to be rotated counterclockwise, and with it gear 62. Gear 64 will consequently be rotated clockwise, causing a similar rotation of shaft 65 and selector pulley 8.

Since in this case the angular rotation Z of gear 67 will be zero, it becomes apparent that the rotation imparted to gear 62 by the action of selector motor 55 will be twice the amount of rotation of shaft 58. Consequently, the output of selector motor 55, and/or the ratio of gears 56 and 57 should be chosen so that the angular rotation of shaft 58 will be one-half of the desired angular rotation of gear 62.

B. *Symbol wheel fixed, recorder position to be moved (FIG. 7)*.—Under this condition, selector motor drive gear 56 will maintain gear 57, shaft 58 and spider shaft 69 stationary. Assuming a counterclockwise rotation of drive motor gear 48, drive pulley 9 will be rotated counterclockwise via gears 50 and 52, and shaft 53. Gear 52 will also rotate gear 67 in a counterclockwise direction via gear 66. Since spider shaft 69 is stationary, the rotation of gear 67 will cause counterclockwise rotation of spider gear 61. This rotation will be imparted to gear 62 and selector pulley 8 will be rotated in a clockwise direction as previously described. However, in this case, the angular rotation X of gear 62 represents the negative of Z, the angular rotation of gear 67. Since Z is dependent upon the rotation of drive motor 47 which also controls the rotation of drive pulley 9, it becomes apparent that the rotation of selector pulley 8 is related to the rotation of drive pulley 9. Because of the gear trains employed, the relationship is an opposite one. Thus, the angular rotation Z is in the same direction as the rotation of drive motor 47 and drive pulley 9 but because of the transformation in the differential mechanism, rotation Z is transmitted to selector pulley 8 as a negative quantity. By a suitable dimensioning of parts, selector pulley 9 will be rotated by an amount sufficient to offset the displacement of symbol wheel 25 caused by the movement of printer 14 relative to selector cable 24.

C. *Symbol wheel and recorder position to be adjusted simultaneously*.—Under this condition, shaft 58 and spider shaft 69 will be rotated as was described under condition A, and gear 67 will be rotated as described under condition B. According to the previously mentioned formula, the algebraic sum of these two rotations will be transmitted to gear 62 which in turn will rotate selector pulley 8. Thus, if the signal to selector potentiometer 54 was such that selector pulley was to be rotated clockwise, the amount of this rotation would be proportionately decreased if drive pulley 9 was to be rotated clockwise and proportionately increased if drive pulley 9 was to be rotated counterclockwise.

While we have described and illustrated a preferred embodiment of our invention, we wish it to be understood that we do not intend to be restricted solely thereto, but that we do intend to cover all modifications which would be apparent to one skilled in the art, and which come within the spirit and scope of our invention.

What is claimed is:

1. Plotting apparatus comprising an arm adapted for movement in a first cordinate; a carriage mounted on said arm for movement along said arm in a second cordinate; a first pulley fixedly mounted on said arm remotely from said carriage; first means for rotating said first pulley; first cable means connected to said carriage and driven by said first pulley to move said carriage along said arm; a rotatable wheel mounted on said carriage; a second pulley fixedly mounted on said arm and remote from said carriage; second means for rotating said second pulley; second cable means driven by said second pulley and engaging said wheel to rotate said wheel, said wheel being rotatable by said second cable responsive to movement of said carriage as well as to rotation of said second pulley; and third means for rotating said second pulley to compensate said wheel for the rotation caused by the movement of said carriage, said third means being operative responsive to the rotation of said first pulley.

2. Plotting apparatus according to claim 1 wherein said third means comprises a differential gearing assembly having said first means and said second means as inputs and said second pulley as an output.

3. Plotting apparatus according to claim 2 wherein said differential gearing assembly comprises, a shaft rotatably driven by said second means, a first gear rotatably mounted on said shaft and driven by said first means, a second gear having an axis of rotation fixed to said shaft and located perpendicular to the axis of rotation of said shaft, said second gear engaging said first gear, and a third gear rotatably mounted on said shaft and driven by said second gear, said third gear being operative to rotate said second pulley.

4. A multiple symbol graphical recorder comprising an arm adapted for movement in a first coordinate; a carriage mounted on said arm for movement along said arm in a second coordinate; means on said arm for moving said carriage along said arm; a printing assembly mounted on said carriage, said printing assembly including a wheel having a plurality of printing symbols mounted thereon; selecting means on said arm for rotating said wheel to move a selected symbol to a selected position, said wheel being rotatable responsive to movement of said carriage as well as to said selecting means; means for maintaining said wheel in said selected position during movement of said carriage by said moving means; and said printing assembly further comprising a housing; a pair of reels mounted on said housing and disposed on each side of said selected position; an inked ribbon wound on said reels, said ribbon passing through said selected position and associated with said selected symbol; means for forcing said selected symbol against said inked ribbon; and means responsive to the actuation of said forcing means to rotate one of said reels to advance said inked ribbon past said selected position.

5. A multiple symbol graphical recorder comprising an arm adapted for movement in a first coordinate; a carriage mounted on said arm for movement along said arm in a second coordinate; means on said arm for moving said carriage along said arm; a printing assembly mounted on said carriage; said assembly including a wheel having a plurality of printing symbols mounted thereon; selecting means on said arm for rotating said wheel to a selected position, said wheel being rotatable responsive to movement of said carriage as well as to said selecting means; means to compensate the movement of said wheel by carriage movement whereby the position of said wheel is determined solely by said selecting means, said compensating means comprising a differential gear mechanism associated with said selecting means and said means for moving said carriage, said compensating means being operative to modify the output of said selecting means.

6. A multiple symbol graphical recorder comprising an arm adapted for movement in a first coordinate; a carriage mounted on said arm for movement along said arm in a second coordinate; means on said arm for moving said carriage along said arm; a printing assembly mounted on said carriage, said assembly including a wheel having a plurality of printing symbols mounted thereon; selecting means on said arm for rotating said wheel to a selected position, said wheel being rotatable responsive to movement of said carriage as well as to said selecting means; means to compensate the movement of said wheel by carriage movement whereby the position of said wheel is determined solely by said selecting means, said compensating means comprising a differential gear mechanism associated with said selecting means and driven by said means for moving said carriage to modify the output of said selecting means.

7. Apparatus for printing a selected symbol at a selected point along a coordinate comprising a support; a carriage mounted on said support for movement along said support in said coordinate; first means for moving said carriage along said support; a printing assembly mounted on said carriage including a wheel having a plurality of printing symbols mounted thereon; a selecting pulley fixedly mounted on said support remotely from said carriage; means to rotate said selecting pulley; means engaging said wheel and driven by said selecting pulley to rotate said wheel to a selected position, said wheel being rotatable by said rotating means responsive to movement of said carriage along said arm as well as to rotation of said selecting pulley; and means associated with said first means and said selecting pulley to compensate the movement of said wheel caused by said carriage movement.

8. A multiple symbol graphical recorder according to claim 7 wherein said wheel is attached to said carriage for rotation about an axis perpendicular to the plane of movement of said carriage; said symbols comprise bars resiliently disposed in slots located near the periphery of said wheel; said slots extend through said wheel in a direction substantially parallel to said axis of rotation; and one end of said bars define printing dies.

9. Apparatus for printing a selected symbol at a selected point along a coordinate comprising a support; a carriage mounted on said support for movement along said support in said coordinate; first means for moving said carriage along said support; a printing assembly mounted on said carriage including a wheel having a plurality of printing symbols mounted thereon; a cable engaging said wheel for rotating said wheel; second means for displacing all points on said cable to rotate said wheel, said wheel being rotatable by said cable responsive to movement of said carriage as well as to operation of said second means; and means actuated directly responsive to operation of said first means to operate said second means to compensate the rotation of said wheel caused by said carriage movement.

10. Apparatus for printing a selected symbol at a selected point along a coordinate comprising a support; a carriage mounted on said support for movement along said support in said coordinate; first means for moving said carriage along said supports; a printing assembly mounted on said carriage including a wheel having a plurality of printing symbols mounted thereon; a cable engaging said wheel for rotating said wheel; second means for displacing all points on said cable to rotate said wheel, said wheel being rotatable by said cable responsive to movement of said carriage as well as to operation of said second means; and means directly connecting said first and second means to operate said second means to compensate the rotation of said wheel caused by said carriage movement.

11. Plotting apparatus comprising an arm adapted for movement in a first coordinate; a carriage mounted on said arm for movement along said arm in a second coordinate; first means for moving said carriage along said arm; a printing assembly mounted on said carriage including a wheel having a plurality of printing symbols mounted thereon; a cable engaging said wheel for rotating said wheel; second means for displacing all points on said cable to rotate said wheel; said wheel being rotatable by said cable responsive to movement of said carriage as well as to operation of said second means; and means actuated directly responsive to operation of said first means to operate said second means to compensate the rotation of said wheel caused by said carriage movement.

12. Plotting apparatus comprising an arm adapted for movement in a first coordinate; a carriage mounted on said arm for movement along said arm in a second coordinate; first means for moving said carriage along said arm; a rotatable wheel mounted on said carriage; a pulley fixedly mounted on said arm and remote from said carriage; second means for rotating said pulley; cable means driven by said pulley and engaging said wheel to rotate said wheel, said wheel being rotatable by said cable responsive to movement of said carriage as well as to rotation of said pulley; and third means for rotating said pulley to compensate said wheel for the rotation caused by the movement of said carriage.

References Cited in the file of this patent

UNITED STATES PATENTS

| | | |
|---|---|---|
| 427,717 | Travis | May 13, 1890 |
| 1,128,225 | Choate | Feb. 9, 1915 |
| 1,504,598 | Bergen | Aug. 12, 1924 |
| 1,746,229 | Dyas | Feb. 4, 1930 |
| 2,651,400 | Young et al. | Sept. 8, 1953 |
| 2,879,876 | Palmer et al. | Mar. 31, 1959 |
| 2,919,002 | Palmer | Dec. 29, 1959 |
| 2,919,008 | Whipps | Dec. 29, 1959 |
| 2,937,913 | Boyle | May 24, 1960 |
| 2,978,086 | Hickerson | Apr. 4, 1961 |
| 3,019,072 | Bose et al. | Jan. 30, 1962 |